3,513,107
CATALYST COMPOSITION AND TREATMENT
METHOD
Norman Harris, Norton-on-Tees, England, assignor to Imperial Chemical Industries Limited, London, England, a corporation of Great Britain
No Drawing. Filed Aug. 11, 1967, Ser. No. 659,853
Claims priority, application Great Britain, Aug. 31, 1966, 38,858/66
Int. Cl. B01j *11/82*
U.S. Cl. 252—438                    4 Claims

ABSTRACT OF THE DISCLOSURE

A non-pyrophoric partly reduced composition convertible to an ammonia synthesis catalyst by further reduction is produced by treating a reduced ammonia synthesis catalyst with ammonia under conditions of temperature and ammonia concentration such that iron nitride formation takes place and then subjecting it to oxidation at such a temperature that any pyrophoric iron remaining after the ammonia treatment is converted to oxide without decomposition of a substantial proportion of the iron nitride.

---

This invention relates to a method of producing a reduced ammonia synthesis catalyst which resists oxidation by oxygen, water or carbon dioxide and to the catalyst composition so made.

The problem of making an oxidation-resistant reduced ammonia synthesis catalyst is important because of the long period of time taken to start up an ammonia synthesis converter using unreduced catalyst and taken to shut down such a converter when this has to be preceded by a careful re-oxidation of the catalyst. It was reported by Khrizman (Bulletin of the Pissarievsky Institute of Physical Chemistry, Ukrainian S.S.R. Academy of Science, 1940, 12, 15–20) that satisfactory resistance to oxidation could be obtained by reacting a reduced catalyst of the iron-alumina-potash type with dry ammonia, and that the ammonia synthesis activity of such a catalyst could be restored merely by reduction with hydrogen. However, other investigators of ammonia synthesis catalysts were not apparently able to reproduce Khrizman's results. For example, Temkin and Pyzhev (U.S.S.R. Journal of Physical Chemistry, 1946, 20, 151–2) preferred to re-oxidise the reduced catalyst superficially by means of a nitrogen-hydrogen mixture containing 0.1 to 0.2% of oxygen. Furthermore Burnett et al. (Industrial and Engineering Chemistry, 1953, 45, 1678–1682) made a small scale test of Khrizman's method and found that the treated catalyst was still pyrophoric: they likewise recommended and indeed adopted an oxidation treatment similar to that of Temkin and Pyzhev. In 1956 Nielsen, in his book "An Investigation on Promoted Iron Catalysts for the Synthesis of Ammonia," gave his opinion that Khrizman's method was not susceptible of industrial application.

Consistent with these teachings, only the method of partial oxidation is available at present for making ammonia synthesis catalysts resistant to oxidation. This is not entirely satisfactory since it is found that many catalysts brought into use again by reduction after partial oxidation are less active than they were after the first reduction. We have now devised a procedure by which an ammonia synthesis catalyst can be made resistant to oxidation with a much less serious incidence of the above-mentioned loss of catalyst activity.

According to the invention there is provided a method of producing a reduced ammonia synthesis catalyst which resists oxidation which comprises treating it with ammonia under conditions of temperature and ammonia concentration such that iron nitride formation takes place and then subjecting it to oxidation at such a temperature that any pyrophoric iron remaining after the ammonia treatment is converted to oxide without decomposition of a substantial proportion of the iron nitride.

The non-pyrophoric catalyst comprising iron nitride $Fe_2N$ (especially corresponding to up to 10, for example 4–8%, of N), a minor proportion of iron oxide (especially corresponding to up to 2%, for example 0.3–1%, of O) and possibly metallic iron is believed to be a new composition of matter and constitutes a further feature of the invention.

The catalyst can contain any of the usual minor constituents and promoters, for example the oxides of potassium, calcium, aluminum beryllium, magnesium, lanthanum, molybdenum and silicon, singly or in combination.

The catalyst can be for example in fused or sintered form and its particle size can be any of those commonly used for ammonia synthesis catalyst. The method of the invention is especially useful for catalysts of the smaller particle sizes (for example about 2 mm.) within the usual ranges, since it provides a very convenient method of activating them in short gas-path converters where the reduction of an iron oxide catalyst precursor produces so much water vapour that precautions have to be taken to prevent back diffusion of water vapour into contact with reduced catalyst. On the other hand the combination of nitridation and partial oxidation gives satisfactory resistance to oxidation also with larger catalyst particles, for Example 3 to 9 mm.

Preferably as much as possible of the resistance of the catalyst to oxidation is due to the ammonia treatment, in view of the higher ammonia synthesising activity of such a catalyst as explained above. On the other hand, since the final oxidation is more rapid and less expensive than the ammonia treatment, catalyst composition oxidised to a greater degree are commercially more attractive. It appears that at least half the iron which could be oxidised by air at ambient temperature should preferably be converted to nitride in order to conserve the activity of the catalysts. Greater than 90% of such nitride formation is readily obtainable without undue expense. There appears to be little advantage to be gained from ammonia treatments giving more than 98% conversion of such iron to nitride.

The nitriding of the catalyst is reversed when the catalyst is contacted with hydrogen or with synthesis gas, hence there is a minimum concentration of ammonia which will produce the desired nitride formation according to the invention. Likewise the hydrogen pressure must not be too great, otherwise the rate of nitride formation becomes inconveniently low. When nitriding is carried out at atmospheric pressure using ammonia-hydrogen mixtures, the relative concentrations of ammonia and hydrogen are preferably at least as follows:

| Temperature ° C.: | $NH_3/H_2$ by vol. |
|---|---|
| 300 | 0.65 |
| 350 | 0.50 |
| 400 | 0.45 |
| 450 | 0.30 |
| 500 | 0.20 |

If the gas which dilutes the ammonia is not hydrogen (for example is nitrogen or argon) the proportion of ammonia can be less, since diluents other than hydrogen do not reverse the nitriding reaction. There is no serious objection to using 100% ammonia since the heat of formation of the nitride $Fe_2N$ is only 2.0 kilogram-calories per gram-mole.

The temperature for nitriding is preferably in the range 300–500° C. Below 200° C. the reaction is inconveniently slow. Above 600° C. the cracking of ammonia to nitrogen and hydrogen is strongly catalysed, and consequently much ammonia is wasted.

We have found that the rate of formation of iron nitride increases very rapidly with temperature, by a factor of 25 between 350° C. and 400° C. and more than 5 between 400 and 440° C., for example. Almost inevitably there is a small temperature gradient in the bed of iron particles being treated, and this means that when nitride formation has been apparently completed there is likely to be some metallic iron which has not been hot enough to undergo conversion to nitride. Using the method of the invention this residual iron is converted to oxide without so rapid a liberation of heat that iron nitride is decomposed or oxidised. We believe this is the mechanism by which our method enables a reduced ammonia synthesis catalyst stabilised predominantly by nitride-formation to be produced. It would presumably be possible to effect complete stabilisation by nitride only if the ammonia treatment were continued long enough and at a high enough temperature: such conditions would not however be industrially usable owing to cost and to the danger involved in handling large quantities of possibly pyrophoric iron.

After nitriding has been substantially completed the catalyst is preferably cooled and then exposed to an oxidising agent. Most suitably air or water vapour is used as the oxidising agent, but it is preferred to begin the oxidation with the oxidising agent diluted with an inert gas such as nitrogen and to increase its concentration gradually in order to avoid a rise in temperature which might initiate a too extensive oxidation of metallic iron and iron nitride. Preferably the concentration of oxidising agent is low enough to keep the catalyst temperature below 100° C., especially below 50° C.

The pressure for nitriding and oxidation can be any which will give the necessary concentration of ammonia or oxygen, but is conveniently atmospheric.

EXAMPLE

A fused ammonia synthesis catalyst (20 kg.) consisting mainly of iron oxide $Fe_3O_4$ with the oxides of aluminium, calcium, potassium and silicon as promoters and having a particle size range 3–9 mm. was reduced at atmospheric pressure by passing hydrogen over it at a volume space velocity 5000 hour$^{-1}$. At the start of reduction the temperature was 350° C. and this was increased gradually to 500° C. over two days, then kept at 500° C. overnight. The catalyst was cooled to 400° C. in the hydrogen atmosphere, and at that temperature ammonia was passed over it for 2.5 hours at a volume space velocity of 600 hour$^{-1}$. Then the ammonia was replaced by nitrogen and the catalyst was allowed to cool to ambient temperature. Air was bled into the nitrogen stream at such a rate that the catalyst was warmed but did not become hotter than 50° C. It was found possible to replace the nitrogen gradually by air while keeping the temperature below 50° C. Finally air only was passed for 2 hours, whereafter the catalyst was discharged. It contained 6% by weight of nitrogen and less than 0.6% by weight of oxygen.

A repeat run in which the air treatment was omitted gave a catalyst which on exposure to air became red hot and was completely oxidised with decomposition of its nitride content.

The activity of the catalyst according to the invention was measured by granding it to fine powder (0.55 to 0.85 mm.) and passing over it a nitrogen-hydrogen (1:3) mixture at a space velocity of 10,000 hour$^{-1}$, a pressure of 200 atmospheres and a temperature of 450° C. in a laboratory test unit. At the same time a similarly ground sample of the starting promoted iron oxide catalyst was after careful reduction tested under the same conditions. The two catalysts were found to be equal in activity.

I claim:

1. A method of producing a non-pyrophoric reduced ammonia synthesis catalyst which comprises treating a reduced ammonia synthesis catalyst at a temperature in the range 300–500° C. and in an ammonia concentration such that iron nitride formation takes place, and then subjecting it to oxidation at such a temperature that any pyrophoric iron remaining after the ammonia treatment is converted to oxide without decomposition of a substantial proportion of the iron nitride.

2. A method according to claim 1 in which at least half the iron initially present which could be oxidised by air at ambient temperature is converted to nitride.

3. A method according to claim 2 in which more than 90% of such iron is converted to nitride.

4. A method according to claim 1 in which oxidation is by means of air diluted with inert gas sufficiently to keep the catalyst temperature below 50° C.

References Cited

UNITED STATES PATENTS 1,158,167 10/1915 Bosch _____ 252—472 XR
2,758,958 8/1956 Anhorn _____ 196—50

OTHER REFERENCES

Nielsen: An Investigation on Promoted Iron Catalysts For Synthesis of Ammonia, J.ul. Gjeuerups Forlag, Copenhagen, 1956, pp. 131–134.

DANIEL E. WYMAN, Primary Examiner

P. M. FRENCH, Assistant Examiner

U.S. Cl. X.R.

252—472